United States Patent [19]

Cassel

[11] 3,761,688

[45] Sept. 25, 1973

[54] HIGH-SPEED CARD READER

[75] Inventor: John W. Cassel, Hatboro, Pa.

[73] Assignee: The National Cash Register Company, Dayton, Ohio

[22] Filed: Mar. 30, 1972

[21] Appl. No.: 239,810

Related U.S. Application Data

[62] Division of Ser. No. 7,649, Feb. 2, 1970.

[52] U.S. Cl. ....... 235/61.11 E, 250/219 D, 250/227

[51] Int. Cl. .......................... G02b 5/14, G06k 7/14

[58] Field of Search ............................ 235/61.11 E; 250/219 D, 219 DC, 227; 200/46

[56] References Cited

UNITED STATES PATENTS

| | | | |
|---|---|---|---|
| 3,225,176 | 12/1965 | Jones | 250/219 DC X |
| 3,461,303 | 8/1969 | Hanson | 250/219 DC |
| 3,566,083 | 2/1971 | McMillin | 235/61.11 E |

*Primary Examiner*—Thomas J. Sloyan
*Attorney*—Albert L. Sessler, Jr. et al.

[57] ABSTRACT

A high-speed card reader including a card feed hopper with a reading station being located directly beneath the hopper and aligned therewith. Because the reading station is aligned with the hopper, the lowermost card in a stack of cards in the hopper can be read while positioned at the bottom of the stack. After being read, the lowermost card is removed by a picker blade, and the next card is read while positioned at the bottom of the stack. All the holes in the card are read simultaneously at the reading station, which is light- operated, and which includes light sources and light sensors which are located on one side of the card being read.

1 Claim, 3 Drawing Figures

HIGH-SPEED CARD READER

This is a division of application Ser. No. 7,649, filed Feb. 2, 1970.

BACKGROUND OF THE INVENTION

This invention relates to a high-speed reader for reading cards with punched holes.

The prior-art card readers generally include card input and output hoppers; a reading station; and transport means for moving a card to be read from the input hopper to the reading station, where the data in the card is read. The reading stations are constructed to read the data in the card serially or to read all the data simultaneously. After the card is read, it is trasnported to the output hopper by the transport means.

In each of the prior-art readers with which applicant is familiar, the card being read must be transported from an input hopper to a reading station, whereas in applicant's reader the cards are read while positioned in the input hopper. Because the cards are aligned as stacked in the input hopper, the lowermost card in the hopper is always in a position to be read by the reading station positioned under the hopper. As soon as the lowermost card is read, it can be moved away by a conventional card removal means to an output hopper. Eliminating the transport problems involved in moving a card to be read from the input hopper to a reading station increases the operating speed of applicant's card reader.

SUMMARY OF THE INVENTION

This invention relates to a high-speed reader for reading cards with punched holes therein. The reader includes an input hopper for storing cards to be read, a reading means, and transport means. The reading means is located directly below the input hopper and is aligned with the lowermost card in the hopper, so that the card can be read while still aligned by the hopper. As soon as the lowermost card is read, the transport means moves the card just read out of the hopper, leaving the next-lowermost card in position to be read. The reading means is adapted to read the data in the card from one side of the card; for example, a light source means and a light sensor means are located on the same side of the card. This is necessitated due to the lowermost card's being read while it is still a part of the deck of cards in the input hopper.

DETAILED DESCRIPTION OF THE EMBODIMENTS

Figures 1, 2, 3:
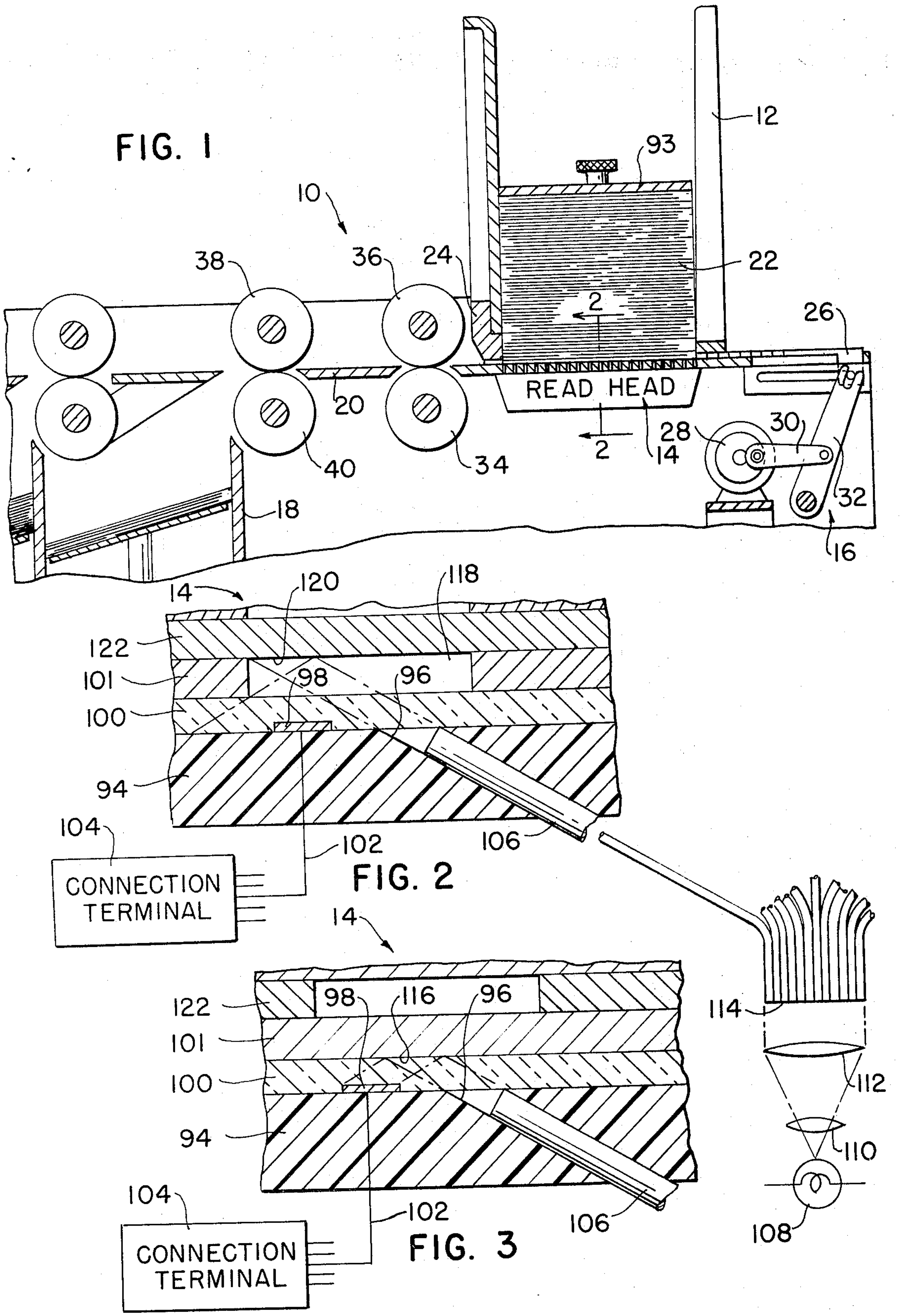
FIG. 1 is a general elevational view, partly in cross-section, of the card reader of this invention showing the location of a reading station below the input hopper of the reader.
FIG. 2 is a cross-sectional view taken along the line 2—2 of FIG. 2 showing how a "hole" in a punched card is read by this invention, which uses light at the reading station.
FIG. 3 is a cross-sectional view similar to FIG. 2 showing how a "no hole" situation in a punched card is read by the light-operated reading station shown in FIG. 2.

FIG. 1 is a general elevational view, partly in cross-section, showing the general arrangement of the various elements included in the card reader of this invention. The card reader is designated generally as 10 and includes an input hopper 12, a reading means 14, a card transport means 16, an output hopper 18, and a table 20.

The input hopper 12 may be a conventional hopper having an open end which is positioned above the table 20 (FIG. 1), so as to enable the lowermost card in a stack 22 of cards to be removed from the stack by the card transport means 16. The hopper 12 has the usual adjustable throat knife 24, which permits only one card at a time to be removed from the hopper. As seen in FIG. 1, the reading means 14 is positioned directly beneath the hopper 12, so that the reading means is axially aligned with the lowermost card in the stack 22 of cards. By this arrangement, each of the cards of the stack 22 is aligned for being read by the reading means 14 as soon as it is placed in the hopper 12. As soon as the lowermost card in the hopper 12 is read by the reading means 14 (to be later described), it is moved out of the input hopper 12 to the output hopper 18 by the transport means 16.

The transport means 16 (FIG. 1) may be conventional and may operate as follows. The transport means 16 includes a picker blade 26, which is mounted for reciprocating movement parallel to the table 20 and is conventionally driven by a crank 28 and by levers 30 and 32. The picker blade 26 moves the lowermost card in the stack 22 far enough to the left (as viewed in FIG. 1) to enable it to be caught between the discharge rollers 34 and 36. From these rollers, the card is advanced farther to the left by rollers 38 and 40 and is diverted into the output hopper 18 or additional hoppers or pockets, as is conventionally done. As soon as the transport means 16 removes the lowermost card in the stack 22, the next card in the stack is in a position to be read by the reading means 14.

The reading means 14 shown in FIGS. 1, 2, and 3, uses light as the operating energy medium. The reading means 14 is of the matrix type, which, as here defined, means that all of the hole positions in a punched card may be read at one time if desired. Because the lowermost card in the stack 22 of cards is read while it is part of the stack, special reading means had to be developed which would enable it to be read while so positioned.

FIG. 2 is an enlarged cross-sectional view of the reading means 14 shown in FIG. 1. This embodiment of FIG. 2 includes an opaque plate 94 having therein a hole 96 for each data location in a card to be read thereby. A conventional photoelectric sensor 98 is positioned at each data location as shown. A protective layer of transparent material (like glass) 100 covers the sensors 98 to protect them from abrasion as the lowermost card is moved thereover by the transport means 16 (FIG. 1). Each sensor 98 has suitable individual connections, like 102, which are routed through appropriate holes in the plate 94 to a connection terminal 104, where conventional amplifiers may be added to amplify the signals received from the sensors 98. Each hole 96 for each data location has one end of an optic fiber 106 located and fixed therein. The remaining end of each optic fiber 106 is positioned to receive light from a light source 108. A conventional objective lens 110 and collimating lens 112 are positioned between the light source 108 and the ends (like 114) of the optic fibers, so as to illuminate each fiber 106 with light.

The reading means shown in FIGS. 2 and 3 operates in the following manner. The optic fiber 106 is so positioned in the plate 94 that, when no hole is present in a data location in the lowermost card 101 (FIG. 3), light from the optic fiber 106 is reflected off the underside of the card 101 at 116 and directed at the associated sensor 98. When a hole (like 118 in FIG. 2) is present in the lowermost card 101, the light from the optic fiber 106 is reflected off the underside of the next-to-lowermost card 120 and misses the associated sensor 98. This difference in light intensity received by the sensor 98 between the condition shown in FIG. 3 and the condition shown in FIG. 2 is utilized to indicate a "no hole" or "hole" condition for a particular data location. After all the data locations are "read", the transport means 16 (FIG. 1) is used to remove the lowermost card 101, so that the next-to-lowermost card 122 may be positioned at the reading means. While the cards are referred to as "lowermost" or "next-to-lowermost", it is apparent that these are relative terms and that the reading means 14 may be positioned vertically instead of being positioned horizontally as shown in FIG. 2. In such a circumstance, the stack of cards 22 would be fed towards the reading means 14 by conventional resilient means instead of using a gravity-type feed plate 93 shown in FIG. 1.

I claim:

1. An apparatus for reading data in the form of data holes in punched cards comprising:

an input hopper means having a feeding end and a discharge end for moving the cards in an axial direction therethrough;

a matrix-type reading head means positioned at said discharge end and axially aligned with said hopper means and in registration therewith, enabling said hopper means to position a card to be read in reading relationship with said reading head means to be read thereby;

said reading head means having individual reading means lying substantially in a plane which is parallel to the plane of the card to be read and arranged in an array corresponding to the various data positions for a punched card;

each said individual reading means being aligned to read a corresponding hole in said card to be read while said card is positioned at said discharge end of said hopper means; and card removal means for removing the card being read after reading, enabling the next card to be read to be positioned in reading relationship with said reading head means by only said hopper means;

each said individual reading means being located entirely on one side of a card when the card is in reading relationship with said reading head means;

each said reading means being optically operated and including:

a photoresponsive sensor for each data position in a card to be read; and illuminating means for illuminating each data position on said one side of a card being read so that light from said illuminating means will be reflected off said one side to reach the associated photoresponsive sensor only when no data hole is present in the data position to thereby indicate the absence of a data hole.

* * * * *